Jan. 19, 1943.  C. A. BRADY, JR  2,308,672
METHOD AND APPARATUS FOR TESTING GUN CHOKES
Filed June 17, 1940
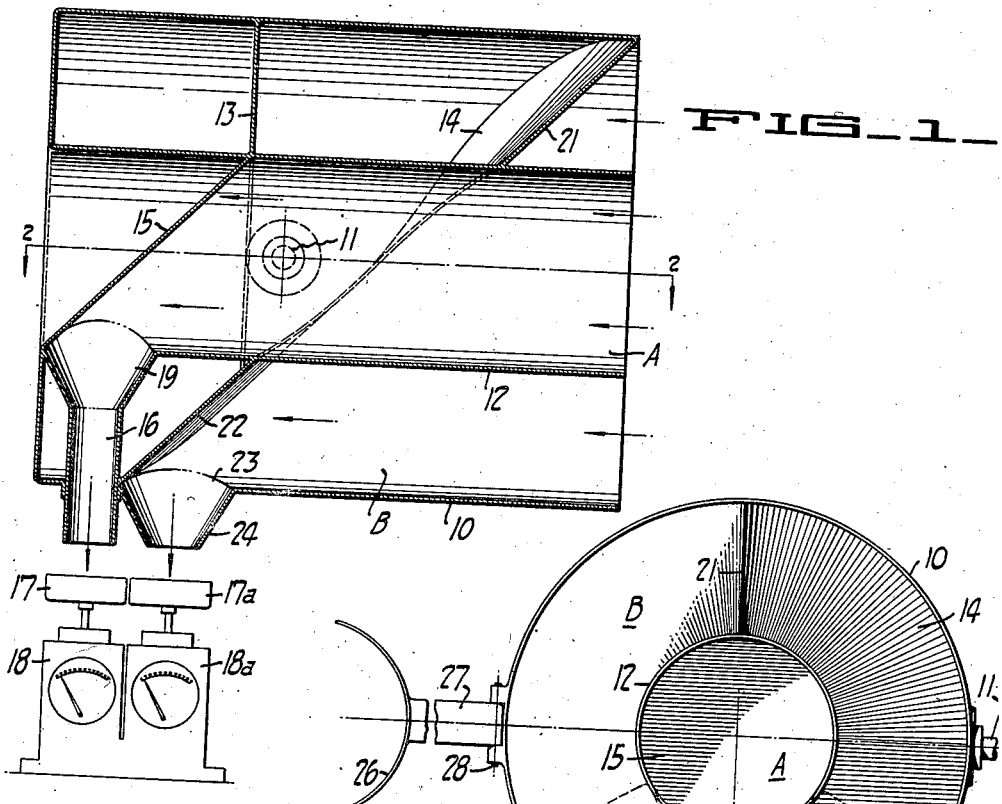
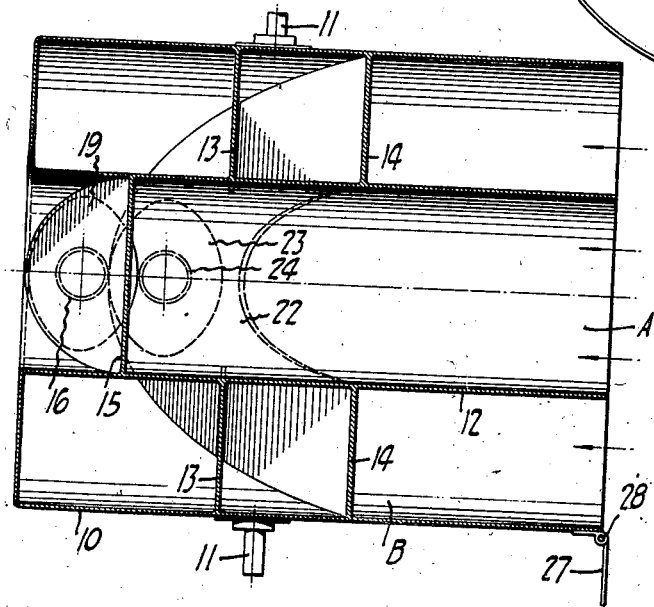
INVENTOR
Charles A. Brady Jr.
BY Harper Allen
ATTORNEY Patented Jan. 19, 1943

2,308,672

UNITED STATES PATENT OFFICE 2,308,672

METHOD AND APPARATUS FOR TESTING GUN CHOKES

Charles A. Brady, Jr., San Francisco, Calif.

Application June 17, 1940, Serial No. 340,956

7 Claims. (Cl. 73—51)

This invention relates generally to the testing of the pattern and distribution of a shotgun charge, and is concerned more particularly with the provision of improved methods and apparatus for enabling accurate and fast testing of the choke of the gun barrel by its effect on the shot pattern.

It is a general object of the invention to provide an improved method and apparatus for determining the percentage of choke in the pattern of shotgun charges and the accuracy of fire.

Another object of the invention is to provide improved method and apparatus for easy calculation of the choke of a gun barrel.

Other objects and advantages of the invention will be apparent from the following description of a preferred embodiment thereof, as illustrated in the accompanying drawing, in which:

Figure 1 is a longitudinal vertical section through apparatus for testing the accuracy and distribution of a shotgun charge.

Figure 2 is a sectional plan view of the apparatus taken as indicated by the line 2—2 in Figure 1.

Figure 3 is a front elevational view of the apparatus.

It is common practice in checking the effect of choke on the shot distribution and in calculating the percentage of choke in the pattern of a shot gun charge, as well as in checking the accuracy of shotguns, to fire a charge through a target having two or more concentric circles with the theoretical point of aim at the gun at the common center of the circles. Generally the inner circle or target area receives all of shot which are directed and controlled by the choke of the gun, while the outer circle is of sufficient diameter to include all other shot in the pattern. By counting the number of holes within the respective target areas, the effect of choke is determined. By inspecting the general distribution of the pattern with reference to the circles defining the target areas, the accuracy of the gun is determined in producing uniform distribution of the pattern with respect to the target circles. This method is not only tedious and expensive, but it is also subject to error because of possible inaccuracy of the counts made.

In accordance with the instant invention, the shot entering the respective target areas are collected so as to provide an accurate determination of the respective proportions of the charge which enter the respective target areas, as well as affording means for studying the shot distribution with respect to the point of aim. Preferably the shot collected in each of the target areas is weighed as a rapid and accurate method of obtaining the ratio of shot in each of the respective target areas with respect to the total weight of the charge.

Referring to the drawing, the apparatus employed in carrying out my method includes an outer cylindrical casing 10 which may be supported on a suitable standard by means of opposite similar trunnions 11 secured to opposite sides of the casing. Within the casing 10 a second cylindrical target member 12 is mounted as by means of a suitable supporting partition 13 and a shot guiding baffle 14 referred to more particularly hereinafter. The partition 13 and baffle 14 may be secured between the cylinders 10 and 12 as by welding, soldering, or any other suitable method of fastening. It will be seen that the concentric cylinders 10 and 12 define respective target areas A and B which are concentric. By selecting appropriate diameters of the cylinders 10 and 12 they may be made to correspond to the desired target areas of conventional size for different gun gauges.

The rearward end of the cylinder 12 is closed by elliptical end wall 15 whose axis is disposed at an angle of approximately 45° to the axis of the cylinder 12 to direct shot received within the cylinder 12 downwardly and into a discharge chute or funnel 16 which leads to a suitable point of collection such as the pan 17 of a suitable weighing scale 18. The angularity and the arrangement of the elliptical wall 15 is preferably such that shot entering the target area A will be deflected and directed into the discharge chute 16 through its oval-shaped upper opening 19.

The baffle 14 is formed in two similar spiral sections which converge at their upper portions to a substantially V-shaped nose 21 which is disposed inwardly of the front edge of cylinder 10. Nose 21 is preferably at an angle to the axis of the cylinders with its lower edge positioned rearwardly of its upper edge. Shot entering the target area B is divided and carried around the cylinder 12 by the baffle 14. Each section of the baffle 14 is curved to diverge downwardly and rearwardly from the V-shaped nose 21 to lead to a common shot-deflecting wall 22 below the inner cylinder 12 and positioned directly above an oval-shaped discharge opening 23 leading to a discharge chute 24. Below the discharge chute 24 a second scale 18a may be provided with its weighing pan 17a. The angularity of the baffle 14 is controlled so that the shot deflected therefrom is directed towards the discharge opening 23 and so that no shot can rebound and be lost from the shot collector.

If desired, a sheet of target paper (not shown) may be suitably fastened over the target areas A and B, and means is preferably provided for marking a circle to define the point of division between the target areas, for example, a marking ring 26 may be provided mounted on an arm 27 hinged at 28 on the cylinder 10 so that it can be swung with the ring 26 coincident with the circumference of the cylinder 12. The ring 26 may carry a ring of felt or similar marking material to receive a marking ink or chalk, so that by swinging the ring 26, a target or choke circle can be impressed on the target sheet defining the line of division between the target areas A and B.

In operation, the shot collecting apparatus is positioned as shown in Figure 1 with the target areas A and B at a selected distance from the gun, say 40 feet. The gun is preferably mounted in a fixed firing device so that its aim can be definitely controlled.

After the target paper is placed in position and marked, the gun is fired and the shot from the gun enter the target areas A and B as indicated by the arrows in Figure 1. The shot entering the target area A, that is, the shot controlled by the gun choke, is guided and directed by the rear wall 15 into the discharge chute 16 and thence into the weighing pan 17 of the scale 18, while the shot entering the target area B outside of the choke ring is directed by the baffle 14 and wall 22 into the discharge chute 24 and into pan 17a of the weighing scale 18a.

If desired, after the shot is fired, the entire cylinder assembly 10 and 12 may be tilted about the trunnions 11 to insure discharge of all shot from within the cylinders 10 and 12 into the respective weighing pans 17 and 17a. If desired, a suitable form of agitator, such as an electrical or mechanical vibrator, may be employed to shake loose any shot which may have become lodged in the cylinders 10 and 12. The reading of the indicators of the weighing scales shows the respective proportions of shot with respect to the total weight received in the target areas A and B, so that the effect of the choke of the gun can be readily determined. At the same time, the distribution of the shot holes on the target paper in front of the target areas A and B can be studied to see that the shot distribution is proper with respect to the target area.

While I have shown the apparatus and method as particularly adapted to testing the choke of shotguns, as well as the shot patterns, the invention may be employed in other forms without departing from its true scope as defined in the claims appended hereto.

I claim:

1. A method of testing the choke and similar characteristics of a shotgun or the like, which comprises firing the gun at a target from a selected point of fire, separately collecting the shot received in different target areas, and weighing the separate charges of shot to determine their relative proportions.

2. Apparatus for testing the choke of shotguns and the like, comprising two concentric shot-collecting cylinders defining different target areas of an extent to include all of the shot from a shotgun charge at a selected range, the respective target areas bearing a relation to each other corresponding to a desired shot pattern at the selected range, and wall means associated with said cylinders providing separate paths of discharge for shot entering the respective target areas.

3. Apparatus for testing the choke of shotguns and the like, comprising at least two concentric shot-collecting cylinders defining different target areas, wall means associated with said cylinders providing separate paths of discharge for shot entering the respective target areas, said shot-collecting cylinders being adapted to receive a paper over the open ends thereof, and a choke ring marker mounted on the outer cylinder for movement into alignment with the inner cylinder to print a target ring on the paper.

4. Testing apparatus for testing the choke of shotguns and the like, comprising at least two concentric shot-collecting cylinders defining different target areas, wall means associated with said cylinders providing separate paths of discharge for shot entering the respective target areas, and means for mounting said cylinders for tilting movement to facilitate discharge of shot therefrom.

5. Apparatus for testing the choke of shotguns and the like, which comprises a pair of concentric ring-like means defining respective target areas of an extent to include all of the shot from a shotgun charge at a selected range, the respective target areas bearing a relation to each other corresponding to a desired shot pattern at the selected range, and shot directing and guiding walls associated with said ring-like means for separately guiding and directing the shot entering said target areas to separate points of collection.

6. Apparatus for testing the choke of shotguns and the like, which comprises a pair of concentric ring-like means defining respective target areas of an extent to include all of the shot from a shotgun charge at a selected range, the respective target areas bearing a relation to each other corresponding to a desired shot pattern at the selected range, shot directing and guiding walls associated with said ring-like means for separately guiding and directing the shot entering said target areas to separate points of collection, and respective scale means at said points of collection for receiving shot from said respective walls.

7. Apparatus for testing the choke of shotguns and the like, comprising a pair of concentric cylinders for mounting with their common axis coincident with the line of aim of a gun, the front edges of said cylinders facing said gun lying in substantially the same plane and defining an inner circular target area and an outer annular target area, a substantially elliptical shot-deflecting wall connected to the rear edge of said inner cylinder, said shot deflecting wall having its axis inclined downwardly and rearwardly to said common axis, means for receiving shot deflected by said elliptical wall, a shot deflecting baffle secured between said cylinders composed of two spirally arranged sections leading downwardly and rearwardly from a V-shaped junction above said inner cylinder to a common deflecting wall below said inner cylinder, and other shot receiving means disposed below said common deflecting wall.

CHARLES A. BRADY, JR.